United States Patent
Seidman et al.

(10) Patent No.: US 8,402,468 B2
(45) Date of Patent: *Mar. 19, 2013

(54) CAPACITY PLANNING BASED ON RESOURCE UTILIZATION AS A FUNCTION OF WORKLOAD

(75) Inventors: David Isaiah Seidman, Durham, NC (US); Mark Jacob Addleman, San Francisco, CA (US)

(73) Assignee: CA, Inc., Islandia, NY (US)

( * ) Notice: Subject to any disclaimer, the term of this patent is extended or adjusted under 35 U.S.C. 154(b) by 1308 days.

This patent is subject to a terminal disclaimer.

(21) Appl. No.: 12/049,840

(22) Filed: Mar. 17, 2008

(65) Prior Publication Data
US 2009/0235268 A1 Sep. 17, 2009

(51) Int. Cl.
*G06F 9/46* (2006.01)
*G06F 15/173* (2006.01)

(52) U.S. Cl. ........ 718/104; 718/100; 718/102; 718/103; 718/105; 709/223; 709/224; 709/226

(58) Field of Classification Search .................. None
See application file for complete search history.

(56) References Cited

U.S. PATENT DOCUMENTS

| | | | |
|---|---|---|---|
| 5,960,181 A * | 9/1999 | Sanadidi et al. ............... 703/21 | |
| 6,260,187 B1 | 7/2001 | Cirne | |
| 6,760,684 B1 | 7/2004 | Yang et al. | |
| 6,816,882 B1 * | 11/2004 | Conner et al. ............... 709/203 | |
| 6,862,623 B1 | 3/2005 | Odhner et al. | |
| 6,898,564 B1 | 5/2005 | Odhner et al. | |
| 7,243,145 B1 * | 7/2007 | Poortman ............... 709/223 | |
| 7,249,179 B1 | 7/2007 | Romero et al. | |
| 7,284,052 B1 * | 10/2007 | Anderson ............... 709/226 | |
| 7,577,770 B2 | 8/2009 | Tanaka et al. | |
| 7,665,090 B1 * | 2/2010 | Tormasov et al. ............ 718/104 | |
| 7,711,822 B1 | 5/2010 | Duvur et al. | |
| 7,941,427 B2 * | 5/2011 | Barsness et al. ............... 707/720 | |
| 2002/0152305 A1 * | 10/2002 | Jackson et al. ............... 709/224 | |
| 2002/0194251 A1 * | 12/2002 | Richter et al. ............... 709/105 | |
| 2004/0078691 A1 | 4/2004 | Cirne et al. | |
| 2005/0005012 A1 * | 1/2005 | Odhner et al. ............... 709/226 | |

(Continued)

OTHER PUBLICATIONS

Office Action dated May 23, 2011, U.S. Appl. No. 11/782,346, filed Jul. 24, 2007.

(Continued)

*Primary Examiner* — Emerson Puente
*Assistant Examiner* — Charles Swift
(74) *Attorney, Agent, or Firm* — Vierra Magen Marcus LLP

(57) ABSTRACT

Capacity planning based on resource utilization as a function of workload is disclosed. The workload may include different types of requests such as login requests, requests to visit web pages, requests to purchase an item on an online shopping site, etc. In one embodiment, data is determined for each of a plurality of workloads. The data includes characteristics of a workload and resource utilization due at least in part processing that workload. Based on the data, utilization of each of the resources as a function of workload characteristics is estimated. Further, based on the estimated resource utilization, workload characteristics that are expected to cause each respective resource to reach a certain level are predicted. That level could be 100 percent utilization, but could be another level. Capacity planning is performed based on the workload characteristics that are expected to cause each respective resource to reach a certain level.

36 Claims, 10 Drawing Sheets

U.S. PATENT DOCUMENTS

| | | |
|---|---|---|
| 2005/0091654 A1 | 4/2005 | Lection et al. |
| 2005/0120111 A1* | 6/2005 | Bailey et al. ............... 709/224 |
| 2005/0183084 A1* | 8/2005 | Cuomo et al. ............... 718/100 |
| 2005/0251802 A1* | 11/2005 | Bozek et al. ............... 718/1 |
| 2006/0047808 A1* | 3/2006 | Sharma et al. ............... 709/224 |
| 2006/0062148 A1* | 3/2006 | Ajiro et al. ............... 370/232 |
| 2006/0080389 A1* | 4/2006 | Powers et al. ............... 709/203 |
| 2006/0085541 A1* | 4/2006 | Cuomo et al. ............... 709/224 |
| 2006/0143608 A1 | 6/2006 | Dostert et al. |
| 2006/0173877 A1* | 8/2006 | Findeisen et al. ............... 707/101 |
| 2006/0200546 A9* | 9/2006 | Bailey et al. ............... 709/224 |
| 2006/0200820 A1 | 9/2006 | Cherkasova et al. |
| 2006/0218551 A1* | 9/2006 | Berstis et al. ............... 718/102 |
| 2006/0259621 A1* | 11/2006 | Ranganathan et al. ........ 709/226 |
| 2007/0061813 A1 | 3/2007 | Beal et al. |
| 2007/0168494 A1* | 7/2007 | Liu et al. ............... 709/224 |
| 2008/0034082 A1* | 2/2008 | McKinney ............... 709/224 |
| 2008/0086734 A1* | 4/2008 | Jensen et al. ............... 718/104 |
| 2008/0114870 A1* | 5/2008 | Pu ............... 709/224 |
| 2008/0172671 A1* | 7/2008 | Bouillet et al. ............... 718/104 |
| 2008/0235397 A1* | 9/2008 | Degenaro et al. ............... 709/241 |
| 2008/0250420 A1* | 10/2008 | Berstis et al. ............... 718/104 |
| 2008/0270526 A1* | 10/2008 | Barnett et al. ............... 709/203 |
| 2009/0031066 A1* | 1/2009 | Bansal et al. ............... 710/113 |
| 2009/0178051 A1 | 7/2009 | Zyuban et al. |
| 2009/0199196 A1 | 8/2009 | Peracha |

OTHER PUBLICATIONS

"Capacity Planning: Discipline for Data Center Decisions", TeamQuest Corporation, TQ-EB01 Rev. A, 2004.

U.S. Appl. No. 11/782,346, filed Jul. 24, 2007 entitled "Capacity Planning by Transaction Type".

Response A to Office Action dated Jul. 28, 2011, U.S. Appl. No. 11/782,346, filed Jul. 24, 2007, 20 pages.

Office Action dated Oct. 17, 2011, U.S. Appl. No. 11/782,346, filed Jul. 24, 2007, 28 pages.

Office Action dated Jul. 6, 2011, U.S. Appl. No. 12/024,783, filed Feb. 1, 2008, 10 pages.

Response to Office Action dated Oct. 4, 2011, U.S. Appl. No. 12/024,783, filed Feb. 1, 2008, 10 pages.

U.S. Appl. No. 12/024,783, filed Feb. 1, 2008.

Office Action dated Dec. 20, 2011, U.S. Appl. No. 12/024,783, filed Feb. 1, 2008, 30 pages.

Notice of Allowance and Fee(s) Due dated Jun. 4, 2012, U.S. Appl. No. 12/024,783, filed Feb. 1, 2008, 13 pages.

Response B to Office Action dated Jan. 9, 2012, U.S. Appl. No. 11/782,346, filed Jul. 24, 2007, 19 pages.

Response to Office Action dated Mar. 2, 2012, U.S. Appl. No. 12/024,783, filed Feb. 1, 2008, 17 pages.

\* cited by examiner

CAPACITY PLANNING BASED ON RESOURCE UTILIZATION AS A FUNCTION OF WORKLOAD

CROSS REFERENCE TO RELATED APPLICATION

This application is related to U.S. patent application Ser. No. 11/782,346, filed on Jul. 24, 2007, entitled, "CAPACITY PLANNING BY TRANSACTION TYPE", which is incorporated herein in its entirety for all purposes.

BACKGROUND

Capacity planning for computer systems has typically been approached as a way to determine the amount of each resource that is required by a computer system (e.g., server) to meet an expected demand. The capacity planning process typically forecasts expected future demand, associates service level requirements with that demand, and then determines the expected quantity and configuration of resources that will ensure acceptable application performance and availability. As an example of capacity planning, a business hosting a web application may determine the appropriate quantity and configuration of computing resources to support the web application.

To capacity plan, existing techniques may build predictive models of response time and/or throughput. However, response time and throughput may be non-linear with respect to resource utilization and are often highly unpredictable. Therefore, use of these techniques may lead to the wrong amount and/or configuration of resources.

Incorrect capacity planning may result in over-provisioning, which increases total cost, or under-provisioning, which degrades application behavior, negatively impacts revenue, and causes poor user satisfaction.

Furthermore, existing capacity planning techniques are typically limited to analysis of hardware resources, and do not consider software resources. Software resources, which can reside at different levels of the computing stack, can be just as limiting as hardware resources.

Moreover, existing capacity planning techniques have little awareness of the complexity and inter-dependencies of composite or transactional applications, where a capacity fault in one component can affect a component that depends on it.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention perform capacity planning based on resource utilization as a function of workload. The workload may include different types of requests made to a system having resources for which capacity planning is desired. Examples of different request types are a login request, a request to visit one page of a collection of web pages, a request to purchase an item on an online shopping site, etc. Note that different request types could utilize different resources. Even if the same resource is utilized different, request types could cause different levels of utilization of the resource. Also note that the different request types are easily understood by system administrators who perform capacity planning.

In one embodiment, utilization of a particular resource as a function of different request types is determined. In this embodiment, data is determined for different workloads having different request types. The data for each workload includes, for each request type, a measure of requests that are made to a system having a resource for which capacity placing is desired. The measure could be total requests or requests per unit time. Requests per unit time can be the rate at which requests are input to the system, but that is not a requirement. The data for each workload also includes utilization of the resource due at least in part to the system. Based on the data for each of the workloads, utilization of the resource as a function of the request types is determined. In one embodiment, utilization of a plurality of resources as a function of different request types is determined.

Another embodiment is a method of capacity planning based on resource utilization as a function of one or more workload characteristics. In this embodiment, data is determined for each of a plurality of workloads processed by a system having a set of resources. The data for a particular workload includes a measure of one or more characteristics of the workload and utilization of the resources due at least in part to the system processing the workload. The one or more characteristics are one or more request types, in one embodiment. Based on the data for each workload, utilization of each of the resources as a function of the one or more characteristics is estimated. Further, based on the estimated resource utilization, a measure of the one or more characteristics that are expected to cause each respective resource to reach a certain level are predicted. For example, the number of requests of each of one or more request types are predicted. The certain utilization level could be 100 percent utilization, but could be another level. Capacity planning is performed based on the measure of one or more workload characteristics that are expected to cause each respective resource to reach the certain level. In one embodiment, based on the size of each workload that is predicted to exhaust each respective resource, a prediction is made as to which resource will be exhausted by the smallest workload. The size of a workload can be measured by the number of requests per unit time.

DETAILED DESCRIPTION

Determining resource utilization as a function of workload, and capacity planning based on resource utilization as a function of workload are disclosed herein. The system workload may include request types which cause different capacity demands on the system. In one embodiment, a workload is associated with an interval. For example, all requests to a system over a particular interval are considered part of the workload.

Resources may include anything that is used to process the requests in the workload. Resources can include hardware, software, and hardware-software hybrid components of a computing system. Examples of hardware resources include a central processing unit (CPU); memory such as RAM, DRAM, SRAM, or other memory; a hard disk; and a network for communicating data. Examples of software resources include thread pools, database connections, etc. A software resource may also be referred to herein as a "virtual resource."

When processing a workload, the level of use or utilization may be measured in terms of the amount of resources utilized compared to the total resource available. In some cases, resource utilization might be associated with a specific request, while in other cases resource utilization may be associated with multiple requests. For example, utilization of a database connection can be associated with a particular request. However, processor utilization might be determined based on average processor utilization during an interval associated with the workload. Thus, processor utilization might be due to the collective demand of multiple requests. Also note that resource utilization could be due, at least in part, to processing transactions that are not a direct result of the requests in the workload. For example, processor utilization over the interval associated with the workload might include utilization due to transactions that are not directly associated with requests in the workload. Thus, it is not required that resource utilization be due only to processing requests in the workload. Examples of how to measure resource utilization are discussed below.

Example Client—Server System

Figure 1A:
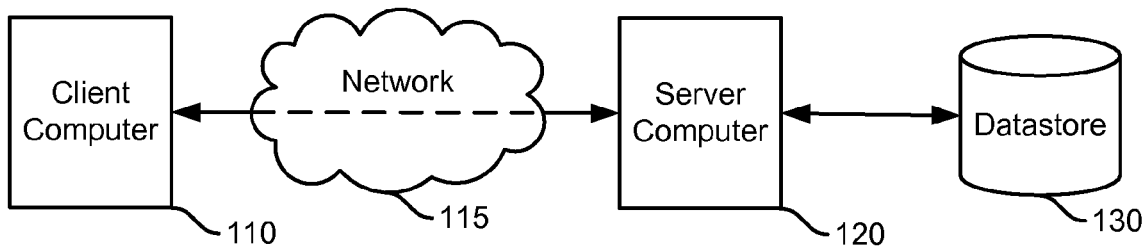
FIG. 1A is a block diagram of one embodiment of a client server system.

FIG. 1A is a block diagram of one embodiment of a client server system. FIG. 1A includes client computer 110, network 115, server computer 120 and data store 130. Client computer 110 and server computer 120 communicate over network 115. Network 115 may be implemented as a private or public network. In some embodiments, network 115 may be implemented as the Internet.

Client computer 110 may be implemented as any computing device capable of communicating with server computer 120. Server computer 120 receives and processes requests from client computer 110. In response to the request, server computer 120 may generate and send a response to client computer 110. Server computer 120 may be implemented by one or more servers. In some embodiments, server 120 is a web server. Server computer 120 may communicate with data store 130 to process requests from client 110 and for other communications.

Exemplar Server

Figure 1B:
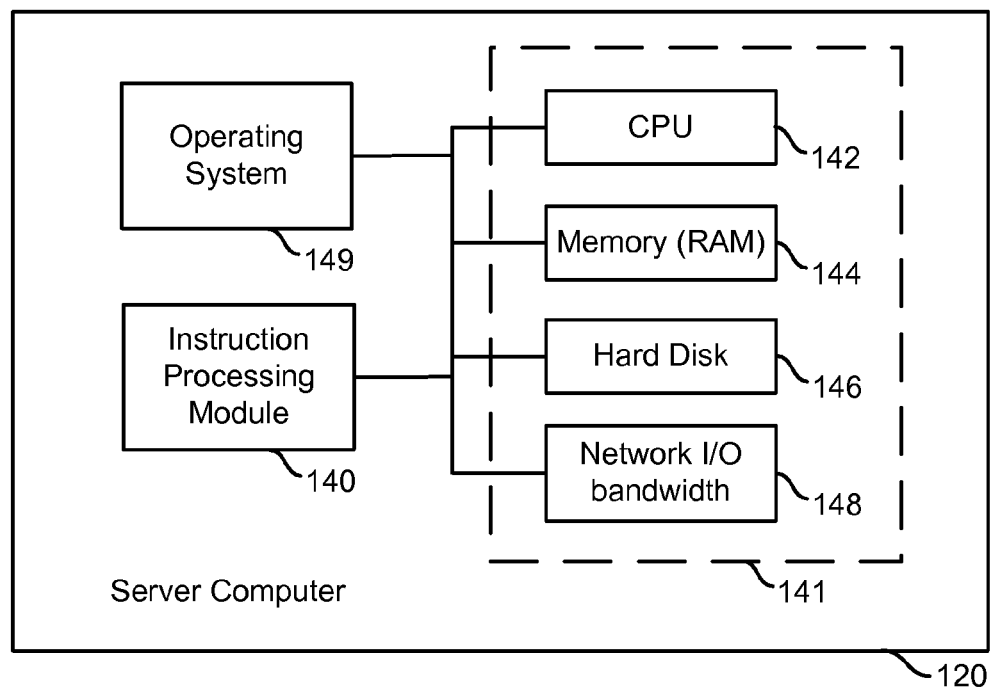
FIG. 1B is a block diagram of one embodiment of a server computer.

FIG. 1B is a block diagram of one embodiment of conceptual server computer 120. Server computer 120 of FIG. 1B provides details that are used in some embodiments of server computer 120 of FIG. 1A. Server computer 120 includes operating system 149, instruction processing module 140 and resources 141. Resources 141 include central processing unit (CPU) 142, memory 144, hard disk 146 and network input and output bandwidth (network I/O bandwidth) 148. Each of resources 142-148 may be used to process network requests received over network 115 and other requests to server computer 120. In some embodiments, instruction processing module 140 may access any of resources 142-148 while processing instructions in response to a request. CPU 142, memory 144, hard disk 146 and network I/O bandwidth 148 may each communicate with operating system 149 and instruction processing module 140.

CPU 142 may be implemented by one or more computer processors on server computer 120. When processing a workload, CPU utilization can be measured as the percentage of time that the CPU is processing instructions. In one embodiment, CPU utilization is learned from an operating system. Because CPU utilization may change substantially over the interval in which a workload is processed, an average (mean, median) or other value such as peak utilization may be taken. Note that in this example, the utilization due to a particular request does not need to be determined. However, for processor utilization, as well as utilization of other resources, the resource utilization due to a particular request could be determined. The resource utilization of individual requests of each request type are then aggregated to determine a resource utilization for each request type. Additional details of determining resource utilization on a per request basis are described in U.S. patent application Ser. No. 11/782,346, entitled, "CAPACITY PLANNING BY TRANSACTION TYPE".

Memory 144 is a resource having a finite amount of memory space. Memory 144 may include one or more types of memory, such as RAM, DRAM, SRAM or some other type of memory. Memory 144 can be used to store objects and other data allocated while processing a workload, storing data during a computer process (such as Java Virtual Machine process), and other data.

Hard disk 146 is a resource implemented as hardware and code for reading from and writing to a hard disk. Hard disk 146 may include hard disk writing and reading mechanisms, code associated with the hard disk and optionally other code and hardware used to read from and write to a hard disk on server computer 120. Hard disk 146 has a finite reading and writing bandwidth and is utilized by read and write methods, and optionally other sets of code, which perform hard disk read and write operations. The utilization of a hard disk resource may be expressed as a bandwidth for writing to and reading from the disk per second, such as seven thousand bytes per second.

Network I/O bandwidth 148 is implemented as code and hardware that operates to communicate to machines and devices external to server 120. For example, network I/O bandwidth 148 may use a number of sockets to communicate with data store 130 and/or other machines external to server computer 120. There is a finite amount of network bandwidth for sending and receiving data over network 115 and a finite number of available sockets (i.e., network connections) to communicate to other devices. The utilization of network I/O bandwidth may be expressed as a number of bytes sent and received per second, such as ten thousand kilobytes per second.

Resources 142-148 are just examples of elements that may be used to process a workload. Other resources, computing components, and other hardware and software elements may be used to process a workload. The level of use and/or utilization of these other hardware and software elements (on one or more servers) may be determined as well. For example, various virtual resources may be used to process workloads. As a particular example, the server computer 120 may access a database 130, thus requiring a database connection. Utilization of database connection can be measured as a count of the database connections that were opened to process the workload. In one embodiment, this count is compared to a total number of available database connections, which may be based on a license agreement. Other examples of virtual resources include, but are not limited to, a Java heap and a thread pool.

Exemplar Instruction Processing Module

Figure 1C:
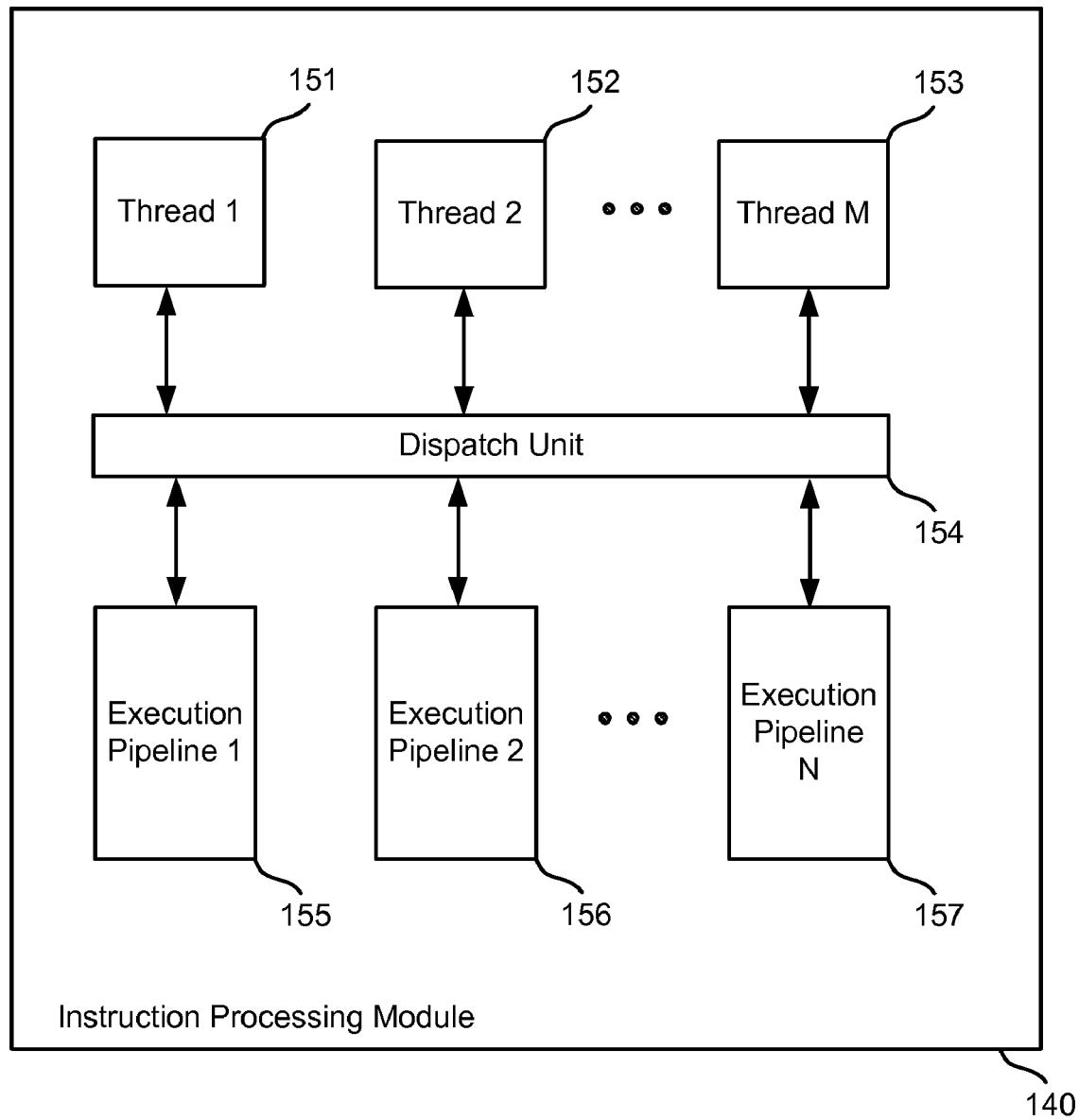
FIG. 1C is a block diagram of one embodiment of an instruction-processing module.

FIG. 1C is a block diagram of one embodiment of instruction processing module 140. Instruction processing module 140 of FIG. 1C provides more detail for one embodiment of instruction processing module 140 of FIG. 1B. It should be noted that FIG. 1C is a conceptual illustration of a system for processing instructions by providing a simplified block diagram of an instruction processing system. Additional components used to process instructions may be used but are not illustrated for purposes of discussion.

Instruction processing module 140 includes threads 151, 152 and 153, dispatch unit 154 and execution pipeline 155, 156 and 157. Each of threads 151-153 contains instructions to be processed as part of responding to a request in a workload. In some embodiments, each thread is associated with a URL and implemented or controlled by a thread object. A thread class may be instantiated to generate the thread object. Dispatch unit 154 dispatches instructions from one of threads 151-153 to one of available execution pipelines 155-157. Dispatch unit 154 may be implemented in hardware. Execution pipelines 155-157 execute instructions provided by a thread as provided to the pipeline by dispatch unit 154. While executing instructions in an execution pipeline, the pipeline may access any of resources 142-148. Execution pipelines 155-157 may be implemented in hardware.

Bytecode Instrumentation

In one embodiment, code is inserted into an application to determine what resources are used by the application. This can help to identify a resource that should be monitored, but is not currently being monitored. Thus, resources that might otherwise be overlooked can be added to the list of resources that are monitored for resource utilization. In one embodiment, the behavior of the application is monitored using bytecode instrumentation. To monitor the application, an application management tool may instrument the application's object code (also called bytecode).

Figure 2A:
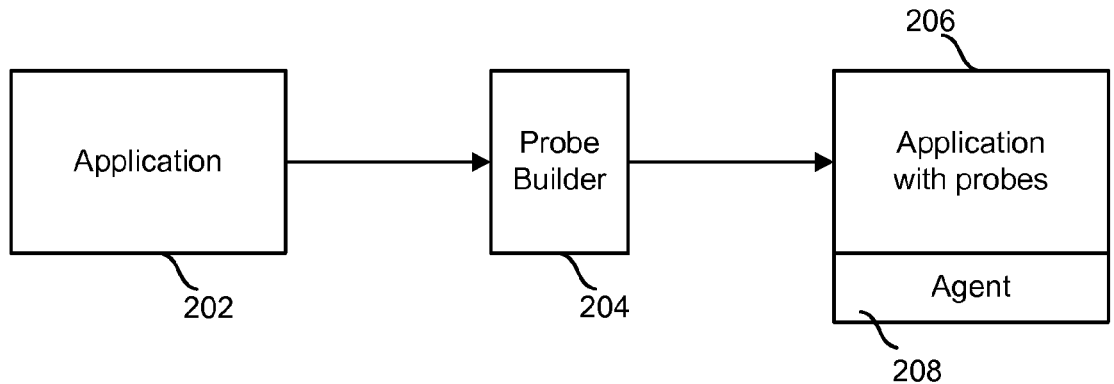
FIG. 2A is a block diagram of a system describing how byte code is instrumented, in accordance with one embodiment.

FIG. 2A depicts an exemplar process for modifying an application's bytecode. FIG. 2A shows Application 202, Probe builder 204, Application 115 with probes and Agent 116. Application 115 includes probes used to access information from the application, and application 202 is the application before the probes are added. Application 202 can be a Java application or a different type of application.

Probe builder 204 instruments (e.g., modifies) the bytecode for Application 202 to add probes and additional code to Application 202 in order to create Application 115. The probes may measure specific pieces of information about the application without changing the application's business logic. Probe builder 204 also generates Agent 116. Agent 116 may be installed on the same machine as Application 115 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein does not actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Exemplar Application Performance Management Tool

Figure 2B:
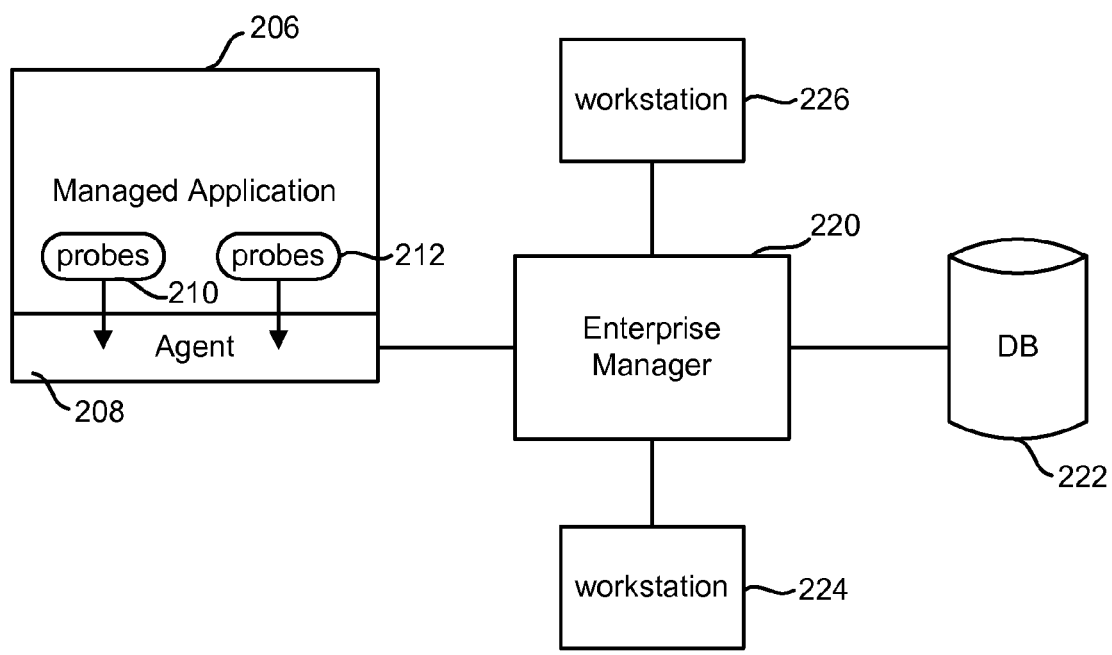
FIG. 2B is a block diagram of a system for monitoring an application in accordance with one embodiment.

In one embodiment, a management application tool is used to determine what resources are used by an application. In one embodiment, the management application tool may is used to collect data that is used to determine how resource utilization depends on workload. FIG. 2B is a block diagram of a system for monitoring an application. In one embodiment, the block diagram of FIG. 2B provides more information for managed application 115 and application monitoring system 117 of FIG. 1. FIG. 2B is a conceptual view of the components of the application performance management tool. In addition to managed application 115 with probes 206 and 208, FIG. 2B also depicts Enterprise Manager 210, database 216, workstation 212 and workstation 214. As a managed application runs, probes (e.g. 206 and/or 208) relay performance data to Agent 116. In one embodiment, probes 206 and 208 may be implemented in objects and other code that write data, change data or otherwise cause the state of an application server to change. Agent 116 then collects, summarizes and sends the data to Enterprise Manager 210.

Enterprise Manager 210 receives performance data from managed applications via Agent 116, runs requested calculations, makes performance data available to workstations 212-214 and optionally sends performance data to database 216 for later analysis. The workstations (e.g., 212 and 214) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. In one embodiment, an alert is raised for an application, component, etc. for which the workload is such that resource utilization is predicted to reach a critical level. The critical level could be 100 percent utilization or some level that is below 100 percent. The elements of the workstation that organize, manipulate, filter and display performance data include actions, alerts, calculators, dashboards, persistent collections, metric groupings, comparisons, smart triggers and SNMP collections. In some embodiments, other the natural language tool can be implemented in the console window, explorer window and other windows within an interface.

In one embodiment of the system of FIG. 2B, each of the components is running on different machines. That is, workstation 212 is on a first computing device, workstation 214 is on a second computing device, Enterprise Manager 210 is on a third computing device, and Managed Application 115 is running on a fourth computing device. In another embodiment, two or more (or all) of the components are operating on the same computing device. For example, Managed Application 115 and Agent 116 may be on a first computing device, Enterprise Manager 210 on a second computing device and a workstation on a third computing device. Alternatively, all of the components of FIG. 2B can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Example Computer System for Implementing Embodiments

Figure 2C:
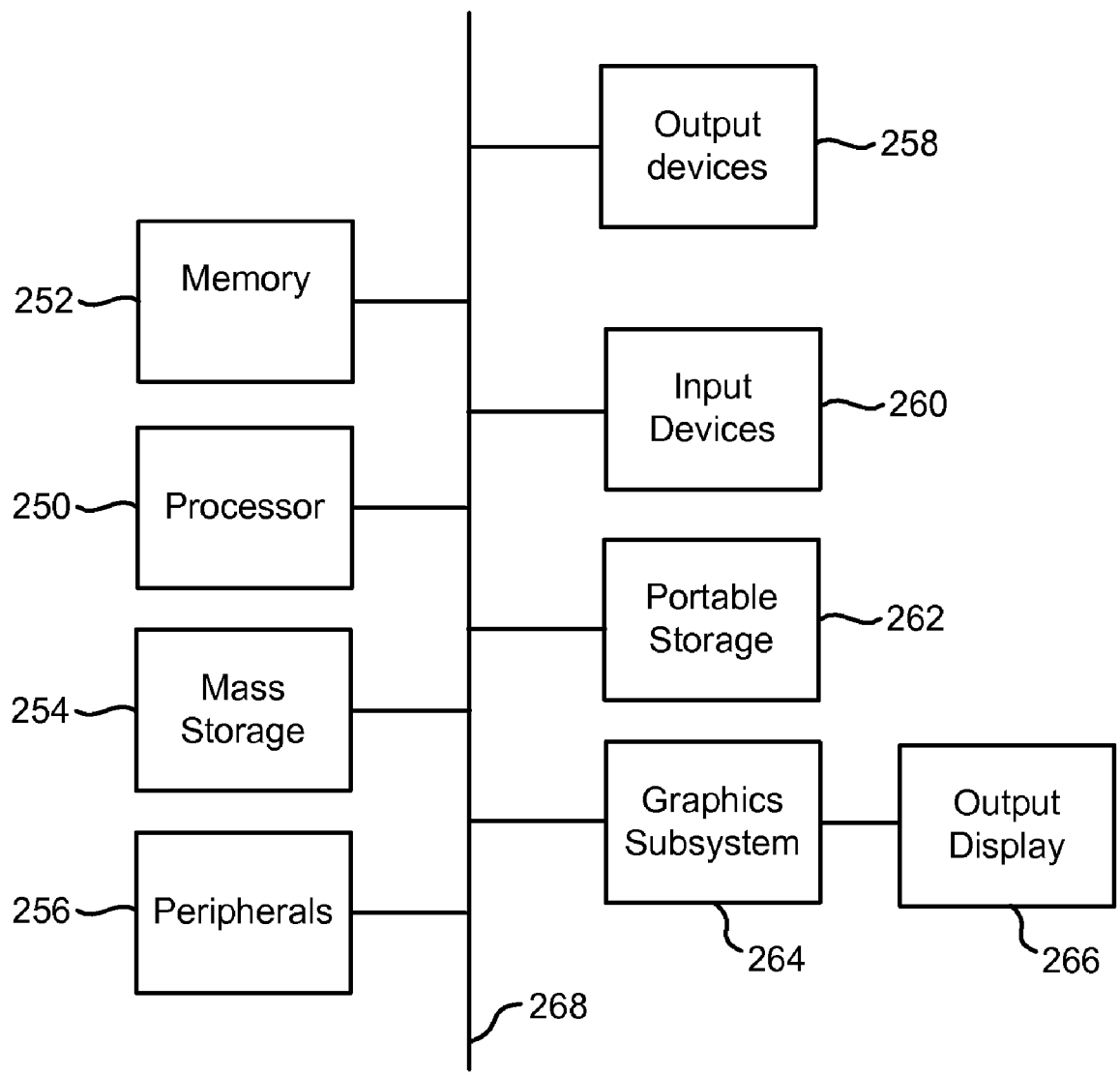
FIG. 2C illustrates a computing system in which embodiments of the present invention may be implemented.

FIG. 2C illustrates a computing system in which embodiments may be implemented. In some embodiments, the computing system of FIG. 2C may be used to implement client computer 110, server computer 120, data store 130, workstations 224 and 225 and database 222. The computing system of FIG. 2C may be used to implement process 400 of FIG. 4, process 500 of FIG. 5, process 700 of FIG. 7, and process 800 of FIG. 8.

The computer system of FIG. 2C includes one or more processors 250 and main memory 252. Main memory 252 stores, in part, instructions and data for execution by processor unit 250. If the system of the present invention is wholly or partially implemented in software, main memory 252 can store the executable code when in operation. The system of FIG. 2C further includes a mass storage device 254, peripheral device(s) 256, user input device(s) 260, output devices 258, portable storage medium drive(s) 262, a graphics subsystem 264 and an output display 266. For purposes of simplicity, the components shown in FIG. 2C are depicted as being connected via a single bus 268. However, the components may be connected through one or more data transport means. For example, processor unit 250 and main memory 252 may be connected via a local microprocessor bus, and the mass storage device 254, peripheral device(s) 256, portable storage medium drive(s) 262, and graphics subsystem 64 may be connected via one or more input/output (I/O) buses. Mass storage device 254, which may be implemented with a magnetic disk drive or an optical disk drive, is a non-volatile storage device for storing data and instructions for use by processor unit 250. In one embodiment, mass storage device 254 stores the system software for implementing embodiments of the present invention for purposes of loading to main memory 252.

Portable storage medium drive 262 operates in conjunction with a portable non-volatile storage medium, such as a floppy disk, to input and output data and code to and from the computer system of FIG. 2C. In one embodiment, the system software for implementing the present invention is stored on such a portable medium, and is input to the computer system via the portable storage medium drive 262. Peripheral device(s) 256 may include any type of computer support device, such as an input/output (I/O) interface, to add additional functionality to the computer system. For example, peripheral device(s) 256 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 2C includes graphics subsystem 264 and output display 266. Output display 266 may include a cathode ray tube (CRT) display, liquid crystal display (LCD) or other suitable display device. Graphics subsystem 264 receives textual and graphical information, and processes the information for output to display 266. Additionally, the system of FIG. 2C includes output devices 258. Examples of suitable output devices include speakers, printers, network interfaces, monitors, etc.

The components contained in the computer system of FIG. 2C are those typically found in computer systems suitable for use with embodiments of the present invention, and are intended to represent a broad category of such computer components that are well known in the art. Thus, the computer system of FIG. 2C can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Overview of Resource Utilzation as a Function of Workload

Figure 3:
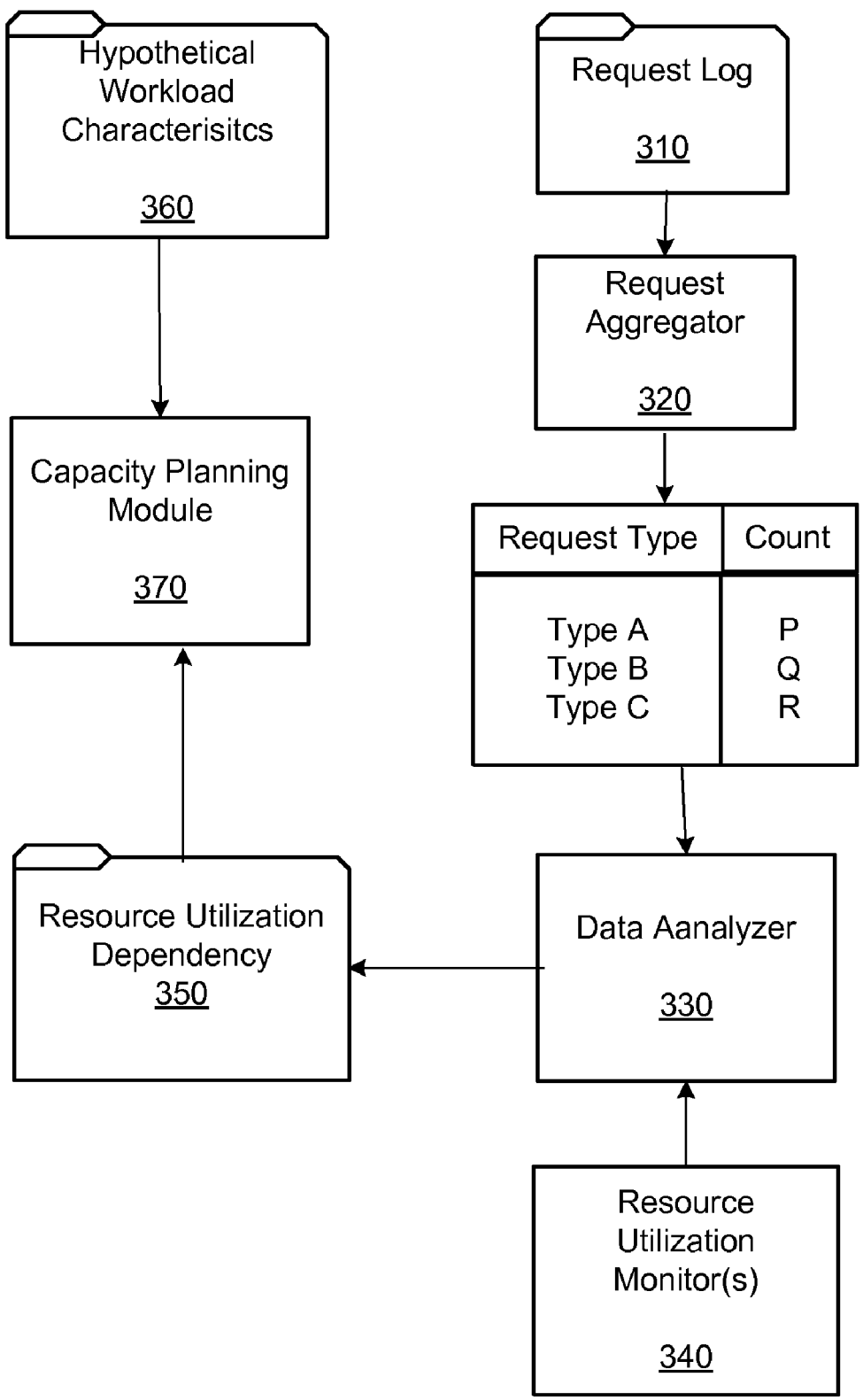
FIG. 3 is a diagram that overviews capacity planning based on resource utilization as a function of on workload, in accordance with one embodiment.

FIG. 3 is a diagram that overviews resource utilization as a function of workload, in accordance with one embodiment. In one embodiment, the exemplar computer system of FIG. 2C stores processor readable instructions in any of main memory 252, mass storage 254 and portable storage 262 which, when executed on the processor 250, implement request aggregator 320, data analyzer 330, resource utilization modules 340, and capacity planning module 370.

The request log 310 contains information pertaining to requests that are processed by the system (e.g., server computer 120). As an example, the request log 310 might contain URLs associated with client requests to a server. Referring briefly to FIG. 1, requests that make up the workload may originate from client 110 to server computer 120. The resources could be any hardware or software that the server computer 120 utilizes in servicing the client request. Servicing client requests are used as an example. The requests are not required to originate from a client computer 110. Moreover, the system that processes the requests is not required to be a server.

The request aggregator 320 analyzes the request log 310 and categorizes the requests into various request types. One example of a request type is a request to purchase an item on an online website. In this example, the request aggregator would aggregate every URL that pertains to an online purchase. Note that the system might process requests associated with many different URLs that are associated with online purchases. As another example, all requests that are to view a page of a collection of web pages are aggregated. The collection of web pages could be related, such as web pages associated with on online catalog, but it is not required that the web pages be related. In one embodiment, each request in the log 310 has associated therewith a time stamp in order to allow the request aggregator 320 to aggregate requests for a particular time interval associated with the workload.

The resource utilization monitor(s) 340 determines a level of resource utilization for each resource being monitored. As an example, if processor utilization is being monitored an operating system can be queried to determine a percentage of processor utilization. For a given workload an average (mean or medium) over an interval could be used. However, some other measure might be used such as peak utilization, minimum utilization, etc.

While processor utilization might conveniently be measured as a percentage, it is not required that the utilization be measured as a percentage. As another example, utilization level could be a count, such as a count of database connections that were utilized during the interval pertaining to processing the requests of a given workload.

The data analyzer 330 inputs resource utilization for each workload, as well as the number of requests (or requests per unit time) of each request type for each workload. Based on this information, for each of the workloads, the data analyzer 330 generates resource utilization dependency information. As an example, the data analyzer 330 performs multivariate regression on the data from every workload where the request types are independent variables and resource utilization is the dependent variable. In one embodiment, each workload contains a single independent variable (e.g., total requests or requests per unit time).

The capacity planning module 370 determines a capacity planning result based on hypothetical workload characteristics 360 and the resource dependency information 350. As an example, the capacity planning module 370 might determine what resource or resources are expected to be a bottleneck given the hypothetical workload characteristics 360.

Predicting Resource Utilization as a Function of Workload

Figure 4:
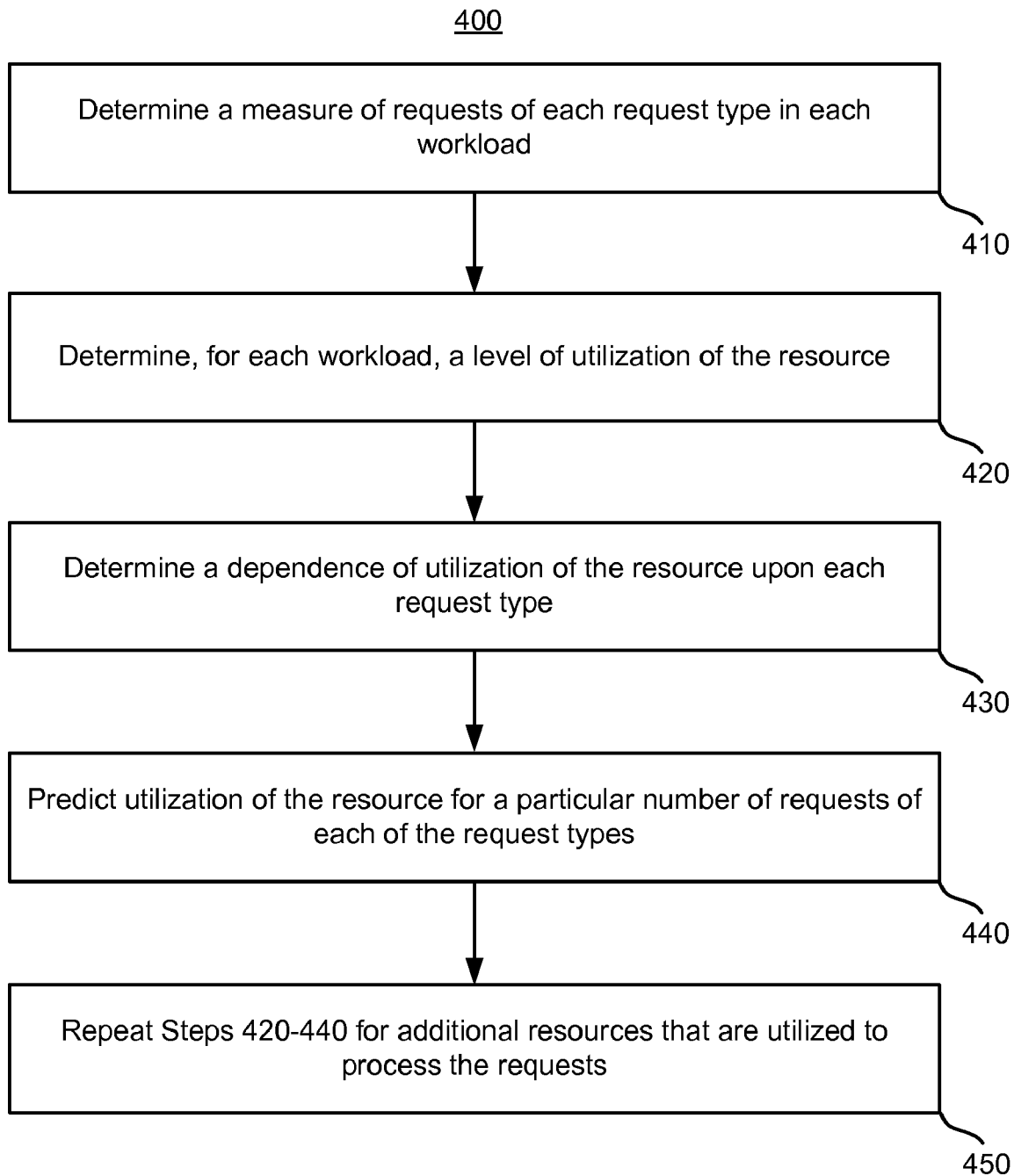
FIG. 4 is a flowchart illustrating steps of a process for predicting resource utilization as a function of workload, in accordance with one embodiment.

FIG. 4 is a flowchart illustrating steps of a process 400 for predicting resource utilization as a function of workload, in accordance with one embodiment. For convenience of discussion, process 400 will be discussed with reference to FIG. 3. The process 400 collects data for a plurality of workloads that are processed by a system having resources for which capacity planning is desired and stores the data in the request log 310. Each of the workloads has requests of different types. As an example, one request type may be a login interaction involving receiving and verifying a username/password combination. Another request type may be to purchase an item on an online website. Still another example is accessing one of a collection of web pages.

Additional data that is collected for each workload pertains to utilization of resources that are used to service the requests. For example, a user login may require utilization of a CPU as well as a database connection to access passwords. Utilization of a database connection is an example of virtual resource utilization. Thus, the resource utilization which is tracked pertains to both hardware resources such as CPUs, memory, disk utilization and virtual resource utilization. Virtual resources may include software as well as database connections.

In step 410, the request aggregator 320 determines a measure of the requests of each of the request types in each of the workloads. FIG. 3 shows an example in which the request aggregator 320 outputs a data structure in which the measure of each request types is their respective counts. However, the measure could be total requests or requests per interval (e.g., requests per unit time). As one example, the requests may be measured based on data in a log of URLs. The requests can be categorized based on the URLs. For example, a URL which is associated with a login request could be one type of request. All login requests for different websites can be aggregated such that a total number of login requests are tabulated. In a similar manner, a request to make purchases can be aggregated together regardless of from which website the purchase is requested.

In step 420, the resource utilization monitor(s) 340 determine, for each workload, a level of utilization of the resource. The utilization level for a workload is due at least in part to the resource processing the requests in that workload. Note that the utilization level may be due to additional demands than the requests in the workload. For example, it may not be desirable to determine the exact utilization level that is due only to processing the requests. Because the workload may reflect requests that are made over an interval, the resource utilization may be an average utilization over a given interval. For example, the resource utilization could be the average CPU utilization over a time period associated with processing the workload. As another example, the resource utilization could be the number of requests for database connections over a time period. The level of resource utilization is input to the data analyzer 330.

In step 430, the data analyzer 330 determines how resource utilization depends upon each of the request types. The determination of step 430 is performed using multivariate regression, in one embodiment. For example, the data for a given workload could include a count of a number of login requests, requests to make a purchase, etc. The data for each workload could also include a utilization level, such as CPU utilization at 22 percent, or four database connections made, etc. The data for each workload thus comprises a data point, such that regression can be applied to the set of data points for all workloads. In one embodiment, multivariate regression is used. For example, resource utilization is a dependent variable and the measure of request types are independent variables. In one embodiment, the regression generates an equation that defines resource utilization as a function of request types. For example, an equation of the following general form can be generated:

$$\text{ResUtil} = a_1 \times Rt_1 + a_2 \times Rt_2 + \ldots a_n \times Rt_n \qquad \text{Eq. 1}$$

In Equation 1, ResUtil is the resource utilization, $Rt_n$ are the request types, and $a_n$ are parameters that are determined from the data based on regression analysis. The data analyzer 330 outputs resource utilization dependency information 350 as a result of step 430.

In step 440, the capacity planning module 370 predicts utilization of the resource for a particular number of requests of each of the request types. The capacity planning module 370 inputs the hypothetical workload characteristics 360 and the resource utilization dependency information 350. For example, a hypothetical number of requests of each request types are applied to the equation that was determined based on multivariate regression. As a particular example, a system administrator who is performing capacity planning may determine that the number of requests for purchases may be expected to increase and therefore a hypothetical workload would contain substantially more requests of that type.

Step 450 is to repeat steps 420, 430, and 440 for additional resources that are utilized to process the requests in the workloads. For example, resource utilization for database connections or memory utilization might also be determined. Note that in step 450 the same workloads and request counts used in steps 420-440 may be used. Step 450 results in the generation of an equation of resource utilization as a function of request type for each resource, in one embodiment.

Capacity Planning as a Function of Workload

Figure 5:
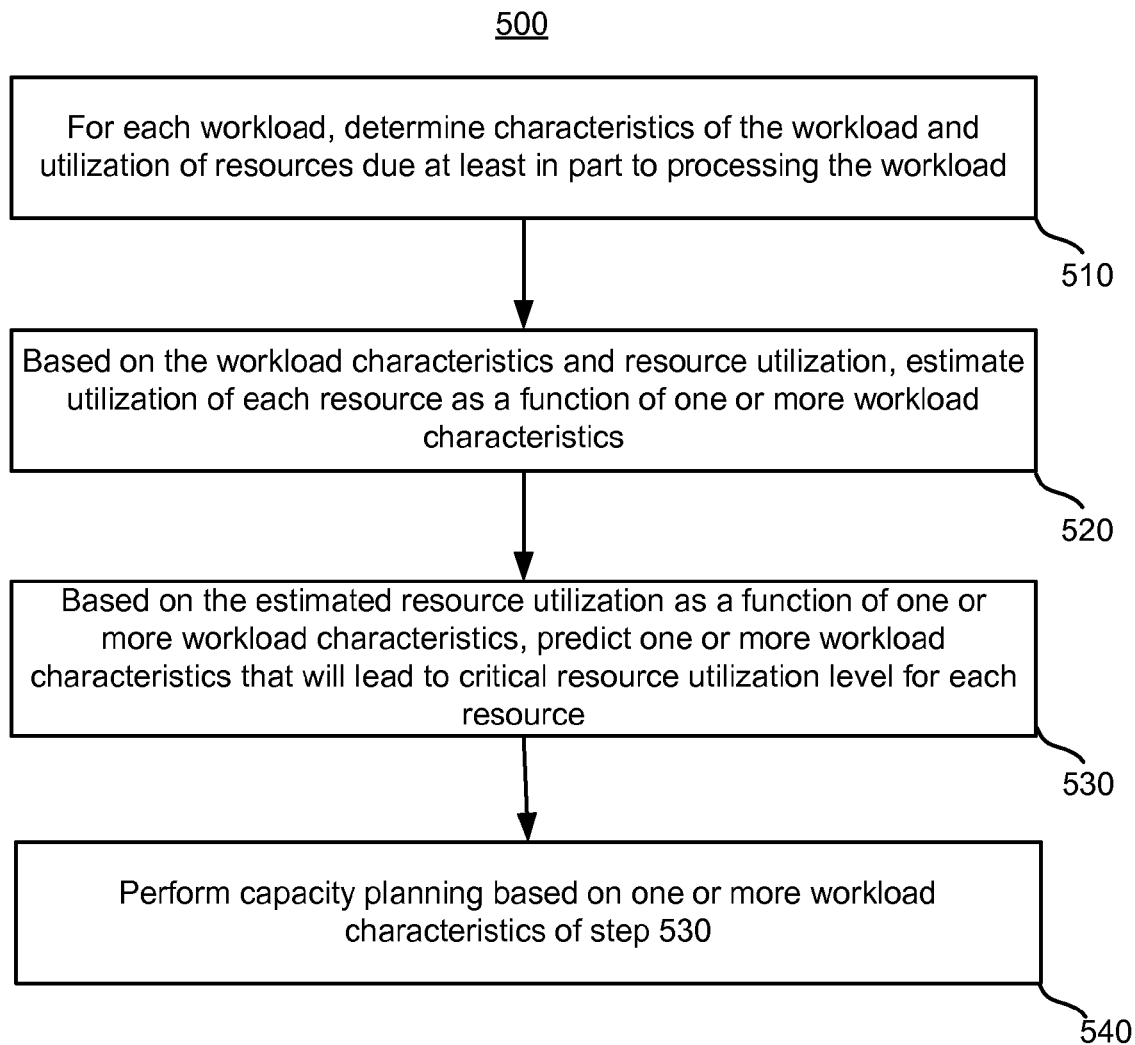
FIG. 5 depicts a process of capacity planning based on resource utilization as a function of a workload, in accordance with one embodiment.

FIG. 5 depicts a process 500 of capacity planning based on resource utilization as a function of a workload, in accordance with one embodiment. Process 500 will be discussed with reference to FIG. 3. The process 500 of FIG. 5 starts in step 510 by collecting data for a number of workloads. That data includes some measure of one or more characteristics of each workload and resource utilization due to processing each of the workloads. The request aggregator 320 may determine the measure of the characteristics of each workload. An example of a measure of the characteristics is the number of requests of each of one or more request types. In one embodiment, the requests are not broken down by request type. The resource utilization monitor(s) 340 may determine the resource utilization due to processing each of the workloads.

In step 520, the data analyzer 330 estimates utilization of each resource as a function of a workload. This is accomplished by analyzing all of the workloads that were collected in step 510. In one embodiment, the data analyzer 330 uses regression is used to analyze the data for each workload in order to determine an equation that describes resource utilization as a function of workload for each resource. In one embodiment, the regression is multivariate in which different requests types are independent variables. In one embodiment, the data analyzer 330 outputs one equation such as Equation 1 for each resource. In another embodiment, the regression is based on total requests in the workload regardless of request type. Thus, the data analyzer 330 outputs an equation of the following format for each resource. In Equations 2-4, ResnUtil is the resource utilization for the nth resource, Rt are the total request types, and a is a parameter that is determined from the data based on regression analysis.

$$Res1Util = a \times Rt \qquad \text{Eq. 2}$$

$$Res2Util = a \times Rt \qquad \text{Eq. 3}$$

$$ResnUtil = a \times Rt \qquad \text{Eq. 4}$$

In step 530, the capacity planning module 370 determines some measure of the characteristics that lead to critical level of resource utilization for each respective resource. An example of a measure of characteristics that lead to critical level of resource utilization are the number of requests (possibly broken down by request type) in a workload that lead to 100 percent resource utilization. However, something less than 100 percent utilization could be considered a critical level. As previously discussed, the workload can have different request types. In one embodiment, the number of requests of more than one request type that will lead to critical resource utilization is determined.

When determining characteristics that will lead to critical resource utilization, the measure of one or more of the request types may be fixed. For example, keeping the number of login requests fixed, the number of purchase requests that will lead to the critical utilization level may be determined.

Figure 6A:
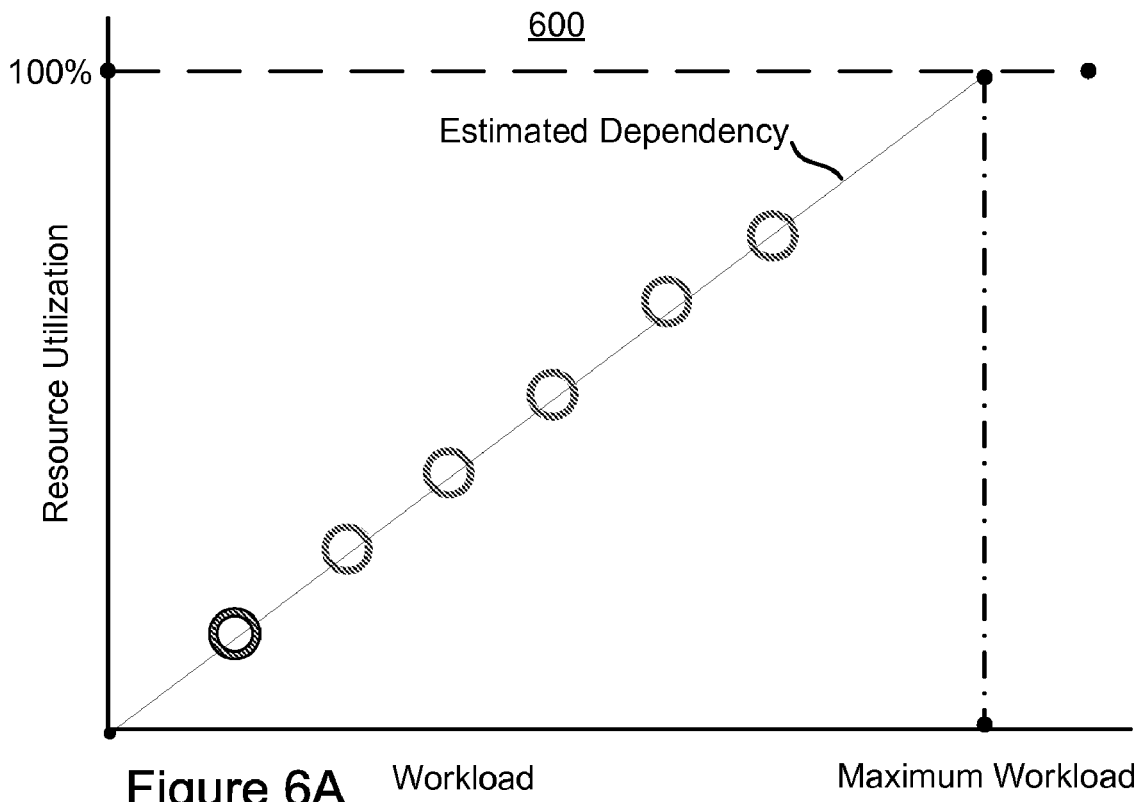
FIG. 6A and FIG. 6B are graphs depicting resource utilization as a function of workload.
Figure 6B:
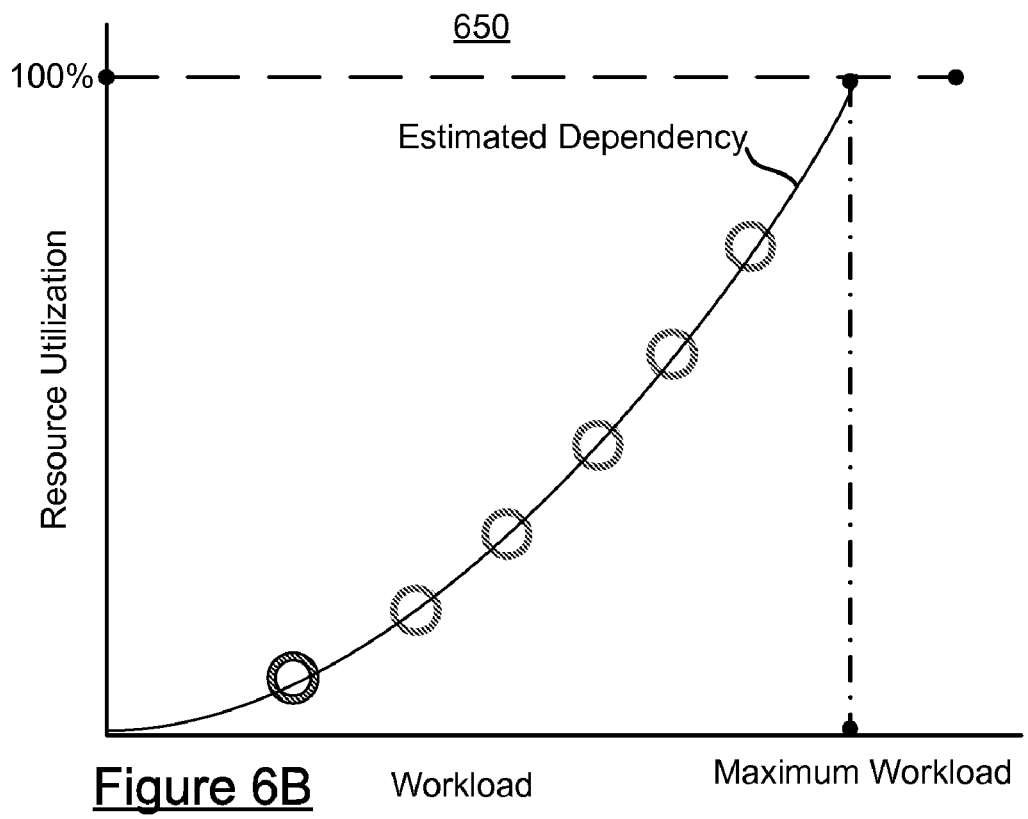

For purposes of illustration, FIGS. 6A and 6B depict example graphs of resource utilization versus workload. In one embodiment, the capacity planner 370 generates and outputs such graphs. Referring briefly to FIG. 6A, the graph 600 depicts a curve labeled Estimated Dependency. The curve may be based on an equation that was determined based on regression analysis of the data collected for each workload. Each data point on the curve is based on a measure of requests in a workload and the resource utilization for that workload, in one embodiment. Each data point pertains to one particular workload. In the graph 600 of FIG. 6A, the estimated dependency is linear. However the dependency is not necessarily linear. FIG. 6B depicts a graph 650 in which the dependency of resource utilization on workload is exponential. The dependency could be another function.

FIG. 6A and FIG. 6B each depict a point at which the curve for estimated dependency crosses 100 percent resource utilization. This point is associated with a point on the workload axis that represents the maximum workload that can be processed by the resource. A curve such as the ones depicted in FIGS. 6A and 6B can be made for each resource in the system. Note that in this example the graphs 600, 650 are two dimensional. However, the workload may have any number of request types in it. That is, in FIGS. 6A and 6B the workload is characterized by the total number of requests in the workload; however, the workload may be characterized by different requests types, in which case workload can be represented by one axis for each request type.

In step 540, the capacity planner 370 performs capacity planning based on the measure of the one or more workload characteristics that are expected to cause critical utilization levels. As an example, for each resource, the capacity planner 370 determines a maximum workload. In one embodiment, the maximum workload is determined as depicted in FIG. 6A or 6B. Again, the critical utilization level could be a value less than 100 percent utilization. The capacity planner 370 is not required to output the graphs. Rather, the capacity planner 370 may output the maximum workload.

Note that the capacity planning is not based on resource utilization over time but rather is based on resource utilization as a function of workload characteristics. This technique is uniquely suited for the complexity of distributing web applications where structural dependencies are spread out across a data center and the mapping from higher level business processes to resources is multivariate. Also note that instead of identifying resources that are under provisioned, resources which are over provisioned can also be determined. This allows an opportunity for cost reduction in server consolidation.

Capacity Planning for a Hypothetical Workload

Figure 7:
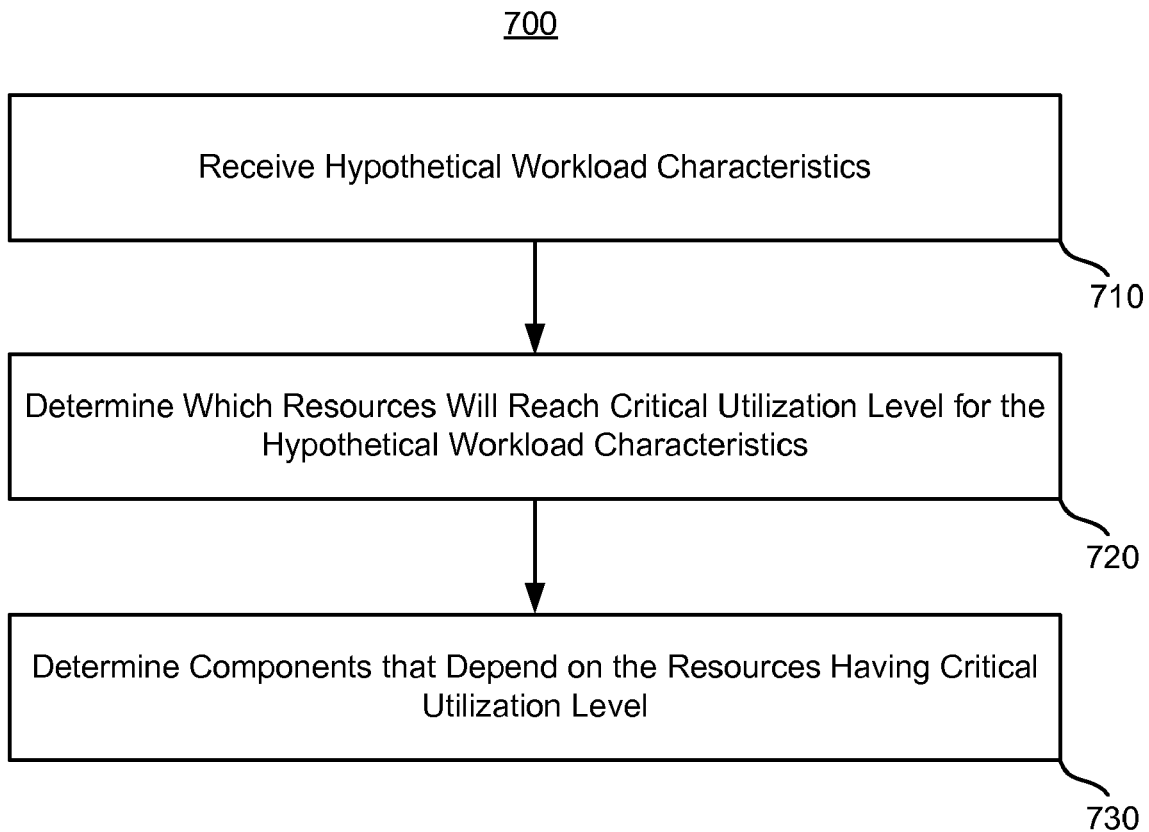
FIG. 7 depicts a flowchart illustrating a process of capacity planning for hypothetical workload characteristics, in accordance with one embodiment.

FIG. 7 depicts a flowchart illustrating a process 700 of capacity planning for hypothetical workload characteristics, in accordance with one embodiment. In one embodiment, process 700 is performed by the capacity planning module 370. In step 710, the capacity planning module 370 receives characteristics of a hypothetical workload. For example, a system administrator may determine that, due to an expected increase in online sales, the system will receive a substantial increase of request types that associated with online purchases. Thus, the system administrator provides a measure of the request types, such as requests of each request type per second.

In step 720, the capacity planning module 370 determines which resources will reach critical utilization levels for the hypothetical workloads. In one embodiment, the capacity planning module 370 applies a count of each request type to the respective equations of resource utilization as a function of workload, which were determined using process 400 or 500.

In step 730, the capacity planning module 370 determines the components, transactions, and applications that depend on the resources having a critical utilization level. It may be that external systems are impacted by the over-utilized resources in the system. This information can clarify the business impact of a resource constraint; therefore, facilitating cost-benefit analysis.

Identifying Critical Resources

Figure 8:
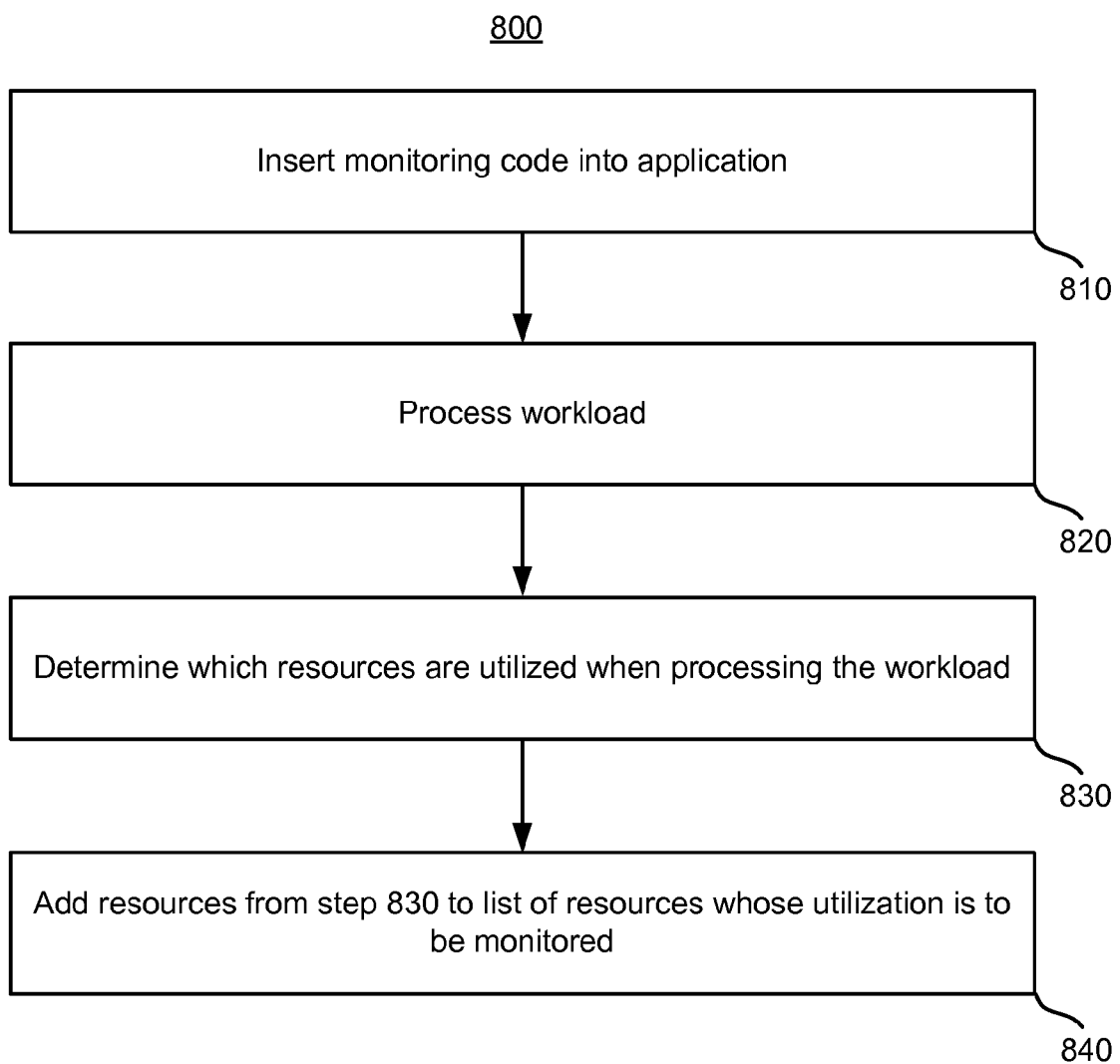
FIG. 8 depicts a flowchart illustrating a process of identifying critical resources for capacity planning, in accordance with one embodiment.

As a part of overall capacity planning, critical resources may be identified and added to the resources that are monitored. FIG. 8 depicts a flowchart illustrating a process 800 of identifying critical resources, in accordance with one embodiment. Monitoring code is inserted into an application at step 810. As an example, using byte code instrumentation, monitoring code may be inserted into an application 206 as discussed above with respect to FIGS. 2A-2B. A workload is then processed at step 820.

A determination of which resources were utilized to process the workload is determined in step 830. The determination may be based on data that is received by agent 208 from probes 210 and 212. The probes may be inserted as monitoring code into application 206 at step 810. In some embodiments, the performance data may be reported to enterprise manager 220 by agent 208. This may be done as the data becomes available or periodically, for example, every fifteen seconds.

The identified resources may includes both hardware and software resources used to process the workload. For example, database connections, a Java heap, CPU, thread pools, etc. are identified. Step 830 is able to identify resources that may have been overlooked as being critical to processing a workload containing certain types of requests.

In step 840 these overlooked resources are added to a list of resources that are monitored when determining resource utilization as a function of workload. In one embodiment, the utilization (or level of use) of each resource is determined based on data collected in step 830. U.S. patent application Ser. No. 11/782,346, entitled, "CAPACITY PLANNING BY TRANSACTION TYPE" provides details of determining resource utilization using byte code instrumentation. However, the level of utilization may be determined without using byte code instrumentation. For example, in one embodiment, the operating system is queried for resource utilization information.

Extensions and Alternatives

Examples of resource capacity planning have been provided herein. However, techniques disclosed herein can be extended to service capacity planning. For example, techniques disclosed herein can be used to determine whether a service level agreements will be met given expected demand.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method of predicting resource utilization, said method comprising:
    determining a measure of requests of each of a plurality of request types in each of a plurality of workloads processed by a resource in a system;
    determining a level of utilization of the resource for each workload, the utilization due at least in part to the resource processing the requests;
    determining resource utilization as a function of the request types, the determining resource utilization as a function of the request types based on the level of utilization of the resource for each workload and the measure of requests of each of the request types in each workload; and
    predicting utilization of the resource for a particular number of requests of each of the request types, the predicting based on the resource utilization as a function of the request types.

2. The method as recited in claim 1 wherein determining the resource utilization as a function of the request types comprises determining an equation that characterizes utilization of the resource as a function of the types of requests.

3. The method as recited in claim 2 further comprising applying the equation to determine a potential workload that is predicted to cause a particular level of utilization of the resource, the potential workload comprises a particular measure of at least one of the request types.

4. The method as recited in claim 3, wherein the particular level of utilization is 100 percent utilization.

5. The method as recited in claim 1, further comprising determining data that describes a level of utilization for at least one other resource due at least in part to the system processing each workload; and further comprising, for each other resource:
    determining, for each other resource, resource utilization as a function of the request types, the determining based on the data for each of the workloads; and
    predicting utilization of each other resource for a particular measure of requests of each of the request types, the predicting based on the resource utilization as a function of the request types for each other resource.

6. The method as recited in claim 1 wherein the resource is a first resource and further comprising:
    automatically determining which resources in the system are used to process at least one of the request types; and
    selecting one of the resources that were determined to process the at least one of the request types as being the first resource.

7. The method as recited in claim 6 wherein the automatically determining which resources in the system are used to process at least one of the request types comprises inserting monitoring code into an application, said monitoring code provides information used to determine which resources in the system are used to process at least one of the request types.

8. The method as recited in claim 1 wherein the resource is a software resource.

9. The method of claim 1 wherein the determining resource utilization as a function of the request types comprises performing a regression analysis.

10. The method of claim 1 further comprising raising an alert if the predicted utilization of the resource for the particular measure of requests of each of the request types is at or above a certain level.

11. The method of claim 1 further comprising determining whether any of the resources are under-utilized based on the predicted utilization of the resource for a particular measure of requests of each of the request types.

12. A computer implemented method of capacity planning, the method comprising:
   determining data for each of a plurality of workloads that are processed by a system having a plurality of resources, the data comprising:
      a number of requests or rate of requests for each request type in each workload processed by the system; and
      utilization of the plurality of resources due at least in part to the system processing each of the workloads;
   performing the following for each of the plurality of resources:
      based on the number or rate of requests for each of the request types in each workload, estimating utilization of a given resource as a function of the one or more request types; and
      based on the estimated resource utilization as a function of the one or more request types, predicting a number or rate of requests for each of the request types that will cause a certain level of utilization of the given resource; and
   performing capacity planning based on the number or rate of requests for each of the request types that will cause the certain level of utilization for each given resource.

13. A method as recited in claim 12 wherein the performing capacity planning comprises predicting which of the resources will be exhausted by the smallest workload.

14. A method as recited in claim 12 wherein the certain level of utilization is 100 percent utilization.

15. A method as recited in claim 12 wherein the certain level of utilization is less than 100 percent utilization.

16. The method as recited in claim 12 wherein the estimating utilization of a given resource is based on how many requests of each of the request types are in each workload processed by the system.

17. The method as recited in claim 12 wherein the estimating utilization of a given resource is based on a rate associated with requests of each of the request types in each workload.

18. The method as recited in claim 12 further comprising automatically identifying at least one of the plurality of resources that processes at least one of the request types prior to the determining data for each of a plurality of workloads.

19. The method as recited in claim 12 wherein the resources comprise software resources.

20. A non-transitory processor readable storage devices having processor readable code embodied thereon, wherein execution of the code on a processor causes the processor to:
   determine a measure based on the number or rate of requests of each of a plurality of request types in each of a plurality of workloads processed by a resource in a system;
   determine a level of utilization of the resource for each workload, the utilization due at least in part to the resource processing the requests;
   determine a dependence of utilization of the resource upon each request type, the determining the dependence based on the level of utilization of the resource for each workload and the number or rate of requests of each of the request types in each workload; and
   predict utilization of the resource for a particular number or rate of requests of each of the request types, the predicting based on the dependence of utilization of the resource upon each request type.

21. The non-transitory processor readable storage device of claim 20 wherein said determining a dependence of utilization comprises determining an equation that characterizes utilization of the resource as a function of the types of requests.

22. The non-transitory processor readable storage device of claim 21 wherein execution of the code on the processor further causes the processor to perform applying the equation to determine a potential workload that is predicted to cause a particular level of utilization of the resource, the potential workload comprises a particular number or rate of at least one of the request types.

23. The non-transitory processor readable storage device of claim 21 wherein the particular level of utilization is 100 percent utilization.

24. The non-transitory processor readable storage device of claim 20 wherein the processor further determines utilization of at least one other resource of the system due at least in part to the system processing each workload; and wherein execution of the code on the processor further causes the processor to, for each other resource:
   determine a dependence of utilization of each other resource upon each request type, the determining based on the system processing each workload; and
   predict utilization of each other resource for a particular number or rate of requests of each of the request types, the predicting based on the dependence of utilization of each other resource upon each request type.

25. The non-transitory processor readable storage device of claim 20 wherein the resource is a first resource and wherein execution of the code on the processor further causes the processor to:
   automatically determine which resources in the system are used to process at least one of the request types; and
   select one of the resources that were determined to process the at least one of the request types as being the first resource.

26. The non-transitory processor readable storage device of claim 25 wherein the automatically determining comprises inserting monitoring code into an application, said monitoring code provides information used to determine which resources in the system are used to process at least one of the request types.

27. The non-transitory processor readable storage device of claim 20 wherein the resources comprise software resources.

28. The non-transitory processor readable storage device of claim 20 wherein the determining a dependence comprises performing a regression analysis.

29. The non-transitory processor readable storage device of claim 20 wherein execution of the code on the processor further causes the processor to perform raising an alert if the predicted utilization of the resource for the particular number of requests of each of the request types is at or above a certain level.

30. The non-transitory processor readable storage device of claim 20 wherein execution of the code on the processors further causes the processor to determine whether any of the resources are under-utilized based on the predicted utilization of the resource for a particular number of requests of each of the request types.

31. A non-transitory processor readable storage device having processor readable code embodied thereon, wherein execution of the code on a processor causes the processor to:
  determine data for each of a plurality of workloads that are processed by a system having a plurality of resources, the data comprising:
    a number of requests or rate of requests for each request type in each workload processed by the system; and
    utilization of the plurality of resources due at least in part to the system processing each of the workloads;
  perform the following for each of the plurality of resources;
    based on the number or rate of requests for each of the request types in each workload, estimates utilization of a given resource as a function of the one or more request types; and
    based on the estimated resource utilization as a function of the one or more request types, predict a number or rate of requests for each of the request types cause a certain level of utilization of the given resource; and
  perform capacity planning based on the number or rate of requests for each of the request types that will cause the certain level of utilization for each given resource.

32. The non-transitory process or readable storage device of claim 31 wherein the performing capacity planning comprises predicting which of the resources will be exhausted by the smallest workload.

33. The non-transitory processor readable storage device of claim 31 wherein the certain level of utilization is 100 percent utilization.

34. A system for processing data, comprising:
  computer readable storage having instructions stored therein; and
  a processor coupled to the computer readable storage, said instructions cause said processor to implement:
    a first module that determines how many requests of each of a plurality of request types are in each of a plurality of workloads processed by a resource in a system;
    a second module that determines a level of utilization of the resource for each workload, the utilization due at least in part to the resource processing the requests;
    a third module that determines resource utilization as a function of the request types, the determining the resource utilization as a function of the request types based on the level of utilization of the resource for each workload and how many requests of each of the request types are in each workload; and
    a fourth module that predicts utilization of the resource for a particular number of requests of each of the request types, the predicting based on the resource utilization as a function of the request types.

35. The system of claim 34, wherein the third module determines the resource utilization as a function of the request types by determining an equation that characterizes utilization of the resource as a function of the types of requests.

36. The system of claim 35, wherein the fourth module applies the equation to determine a potential workload that is predicted to cause a particular level of utilization of the resource, the potential workload comprises a particular measure of at least one of the request types.

* * * * *